F. HANAMAN.
PROCESS OF CONNECTING FILAMENTS AND FEED WIRES FOR ELECTRIC INCANDESCENT LAMPS.
APPLICATION FILED AUG. 28, 1909.
1,031,710. Patented July 9, 1912.
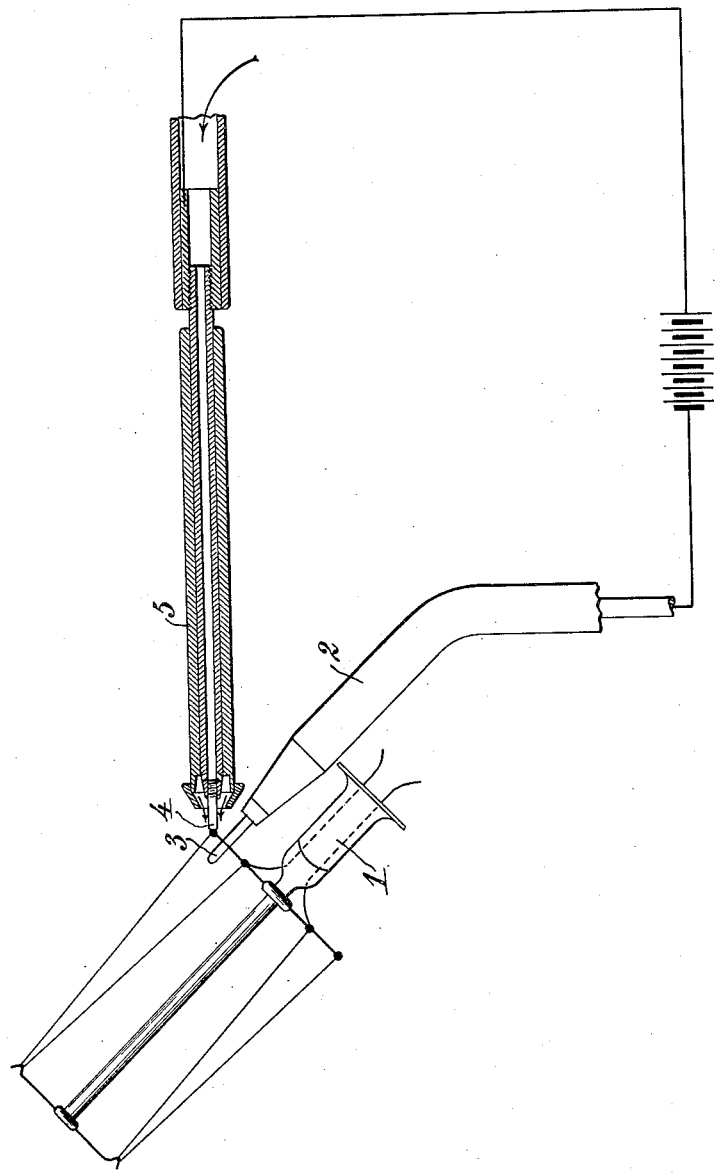
WITNESSES:
René Bruine
William F. Martinez
INVENTOR:
Franz Hanaman,
By Attorneys,
Arthur␣␣

UNITED STATES PATENT OFFICE.

FRANZ HANAMAN, OF BUDAPEST, AUSTRIA-HUNGARY, ASSIGNOR TO GENERAL ELECTRIC COMPANY, A CORPORATION OF NEW YORK.

PROCESS OF CONNECTING FILAMENTS AND FEED-WIRES FOR ELECTRIC INCANDESCENT LAMPS.

1,031,710.    Specification of Letters Patent.    Patented July 9, 1912.

Application filed August 28, 1909. Serial No. 515,034.

*To all whom it may concern:*

Be it known that I, FRANZ HANAMAN, a subject of the King of Hungary, and a resident of Budapest, Austria-Hungary, have invented certain new and useful Improvements in Processes of Connecting Filaments and Feed-Wires for Electric Incandescent Lamps, of which the following is a specification.

In application No. 497,177, filed May 20th, 1909, I have described and claimed a connection between metallic filaments and feed wires of electrical incandescent lamps which consists in a metal phosphid or mixtures of metal phosphids with each other or with metals or oxids or hydro-oxids thereof. According to said invention the phosphids, etc. are preferably mixed in a finely divided condition with water or other volatile cement so as to form a paste which is applied to the joint or connection and then dried and sintered or melted.

According to the present invention I sinter or melt the connection in a stream of gas so that any possible detrimental overheating of the phosphid solder can be avoided by regulating the gas current. By this process it is not necessary to work in a reducing or in an indifferent atmosphere, but the work can be carried on in the open air.

In carrying out the process I prefer to use the apparatus shown in the accompanying drawing, which forms a part of the invention.

In the drawing 1 is a lamp frame with the metal filaments secured in place by the phosphid paste.

3 is an electrode attached to the insulated frame 2.

4 is a second electrode which is movable and 5 is a tube surrounding the electrode 4 through which, from a gasometer or the like, any suitable incombustible gas current (which may even be air) can be blown upon the soldering knot to be formed. The lamp frame 1 with the filaments pasted on is pressed lightly against the electrode 3 (with the left hand) and then the electrode inclosed by the pipe 5 is made to bear (by the right hand) upon the knot to be melted, and a light arc is produced, thus sintering or melting the paste. By providing a stream of gas through the pipe 5 the soldering knot is immediately cooled off in an effective manner, so that it again cools or solidifies very quickly after the electrode 4 is removed.

The process is particularly suitable for soldering by means of metal phosphids which (like gold phosphid for instance) become easily decomposed when heated to high temperatures. Both the process and the apparatus, however, may be used in connection with other soldering material.

While I have described in detail one form of the present invention it is to be understood that I do not wish to be limited thereto, since variations may be made therein without departing from the invention.

What I claim is:—

The process of making an electrical connection between a filament and a leading-in wire which consists in forming at the joint a knot of low melting soldering material which is liable to become decomposed when heated to a high temperature, drawing an electric arc at the connection, and maintaining the temperature of the knot below the decomposing point of such material by playing a stream of gas on the said knot.

In witness whereof, I have hereunto signed my name in the presence of two subscribing witnesses.

FRANZ HANAMAN.

Witnesses:
 LEO KRAUSE,
 MICHAEL TOMOR.